United States Patent [19]

Lovell et al.

[11] 4,156,865

[45] May 29, 1979

[54] HIGH LOAD CLEARANCE SENSORS

[76] Inventors: Walter Lovell, 348 Mountain Rd.;
Richard R. Lawrence, 39 Manchonis
Rd., both of Wilbraham, Mass. 01095

[21] Appl. No.: 863,326

[22] Filed: Dec. 22, 1977

[51] Int. Cl.² .................... G08B 21/00; H01H 3/16
[52] U.S. Cl. .................................. 340/61; 340/87;
200/61.42
[58] Field of Search ................... 340/52 H, 61, 87;
200/61.41, 61.42, 61.43, 61.44

[56] References Cited

U.S. PATENT DOCUMENTS

| 2,554,371 | 5/1951 | Marx | 340/61 X |
| 2,834,002 | 5/1958 | Nordslek | 340/61 |
| 3,269,783 | 8/1966 | Kriz | 340/61 X |
| 3,488,461 | 1/1970 | Webb | 200/61.44 |

Primary Examiner—Alvin H. Waring
Attorney, Agent, or Firm—Charles R. Fay

[57] ABSTRACT

In combination with a vehicle, an upwardly extending mast adapted to contact an overhead obstruction, and signalling the driver of the vehicle the presence of the obstruction.

2 Claims, 4 Drawing Figures

U.S. Patent May 29, 1979 4,156,865
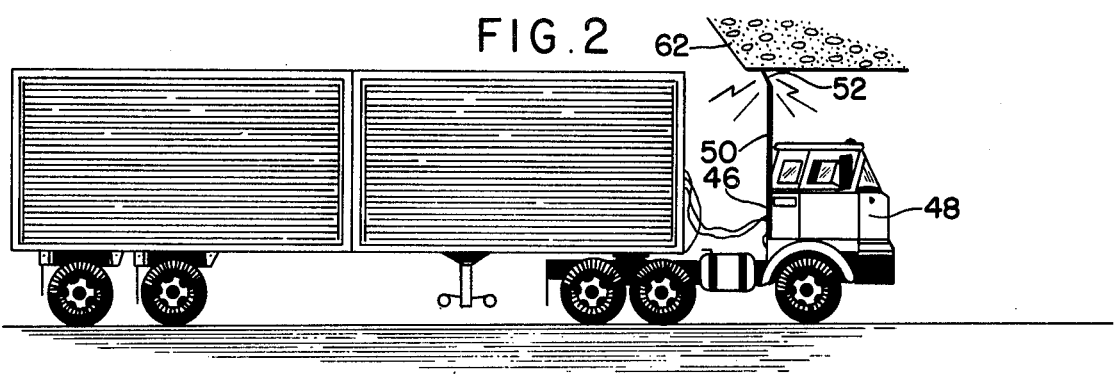
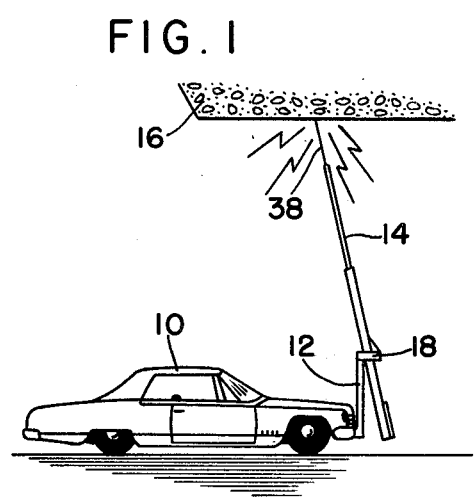
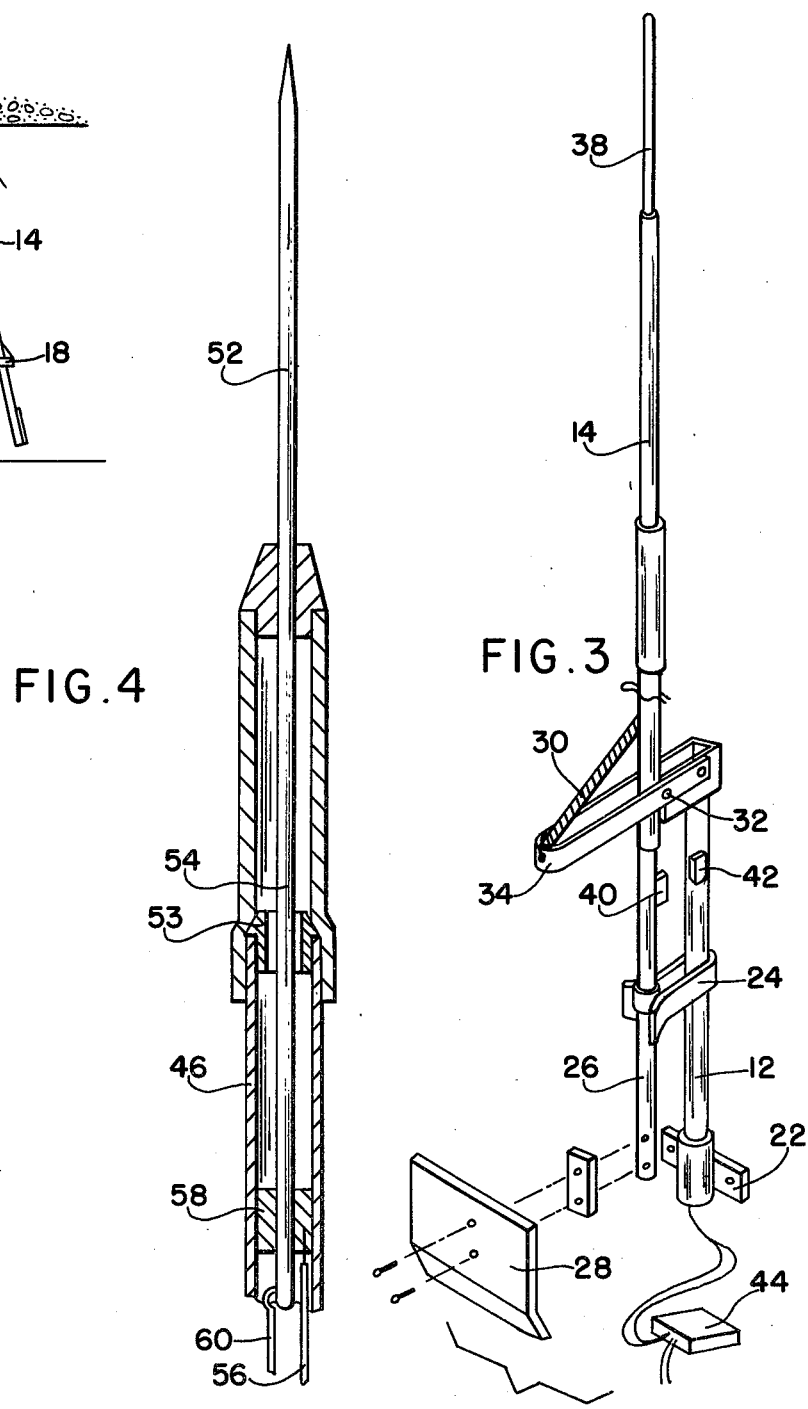

HIGH LOAD CLEARANCE SENSORS

BACKGROUND OF THE INVENTION

Many drivers of motor vehicles and particularly trucks would be greatly helped in the operation of the vehicle if they were provided with means for automatically signalling the presence of an overhead obstruction, particularly at the entrance of tunnels, underpasses, or the like; and it is the object of the present invention to provide such a device one of which is particularly adapted for automobiles and the other one being particularly adapted to trucks.

SUMMARY OF THE INVENTION

A mast is provided at the forward part of the vehicle or on the cab of a truck, said mast extending upwardly and being deflected by an overhead obstruction, the deflection thereto energizing a signal of any kind such as a light, bell, or buzzer, informing the driver that an obstruction has been encountered. There are two forms of the present invention. One form relates to an automobile and in this case the mast is pivoted on a fixed support and uses a magnetic reed switch which is energized when the mast is tilted to the rear upon striking the overhead obstruction.

The other form of the invention is for instance for a truck. The mast may be mounted at the rear of the cab of the truck if desored, and includes a feeler, said feeler deflecting, and in so deflecting, closing an electric circuit to the signal aforesaid with respect to the automobile.

DISCUSSION OF THE PRIOR ART

Applicant is not aware of any prior art on the subject of this invention.

BRIEF DESCRIPTION OF THE FIGURES

FIG. 1 is a view in elevation illustrating the operation of the sensor as applied to an automobile;

FIG. 2 is a similar view showing a sensor applied to a truck;

FIG. 3 is a perspective view illustrating the mechanism of the automobile sensor, parts being exploded in order to better show the invention; and FIG. 4 is a sectional view illustrating the sensor device applicable to a truck.

PREFERRED EMBODIMENTS OF THE INVENTION

Referring to FIG. 1 a conventional vehicle such as an automobile is indicated by the reference numeral 10. At the forward portion thereof an upright fixed bracket 12 pivotally mounts a mast 14. The mast 14 at the top end thereof has encountered an obstruction 16 which causes it to tilt on a pivot 18 on bracket 12 and by means to be described thereby energizes a signal to the vehicle driver.

Referring now to FIG. 3, the upright fixed support is indicated by the reference numeral 12 and can be supported in anyway desired as for instance on the front bumper of the vehicle as by a bracket 22. The support 12 has a snap spring mast retainer 24 which normally retains the mast 14 in the upright position shown. At the bottom end 26 of the mast there is a wind deflector 28 and it will be seen that this tends to hold the mast in the upright position assisted by a tension spring 30 connected to the mast above the pivot 32 on bracket 34. This mast extends upwardly and may terminate in a plastic top 38.

When the obstruction 16 is encountered by the tip 38, the mast pivots to the rear as shown in FIG. 1, in which case magnetic or reed switches 40 and 42 are separated, energizing a circuit to a control box 44 energizing in turn any kind of signal which may be desired and which is not shown, as being conventional.

Referring now to FIG. 4 a different kind of sensor is indicated which is especially adapted to trucks and this includes a mast or the like 46 which may be connected to the cab 48 and including an extension mast 50 extending upright and having a deflectable terminal feeler 52, all as shown in FIG. 2. When this feeler is deflected, it energizes a packed bushing 53 due to the deflection of the member 54 which is merely an extension of the deflectable feeler 52. When this happens contact is made in the way before described with respect to a circuit indicated at 56 to a control box not shown but similar to that shown at 44 for the purpose described. Reference numeral 58 indicates an insulated bushing in which the feeler 54 may be mounted and this may be held in place by any kind of support which is indicated at 60. The support 60 maintains the feeler in its upright position when not in contact with an obstruction such as indicated at 62 in FIG. 1.

The difference between the two embodiments of the invention resides in the fact that the device applied to the automobile 10 is pivotable whereas the device applied to the truck is not pivotable but is deflectable.

We claim:

1. In combination with a vehicle having a front bumper, a mast, a pivot mounting said mast on said front bumper in substantially upright condition with respect to said vehicle, an electric circuit, a signal, a magnetic reed switch on said mast closing the circuit and energizing said signal upon deflection of said mast, and wind actuated means assisting in maintaining the mast normally upright.

2. The combination of claim 1 including a fixed bracket on said front bumper, said pivot being on said bracket.

* * * * *